April 8, 1924.                                                          1,489,873
G. WEISS
EGG SEPARATOR
Filed March 2, 1922

Inventor,
George Weiss,
By [signature] Atty.

Patented Apr. 8, 1924.

1,489,873

UNITED STATES PATENT OFFICE.

GEORGE WEISS, OF CHICAGO, ILLINOIS.

EGG SEPARATOR.

Application filed March 2, 1922. Serial No. 540,542.

*To all whom it may concern:*

Be it known that I, GEORGE WEISS, a citizen of the United States, residing at Chicago, in the county of Cook and State of Illinois, have invented certain new and useful Improvements in Egg Separators, of which the following is a specification.

This invention relates to improvements in egg separators for separating the contents of eggs, and one of the objects of the invention is to provide an improved device of this character by means of which the contents of an egg may be readily and expeditiously separated, and which device will be of a simple, durable, cheap and sanitary construction.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which—

Figure 1:
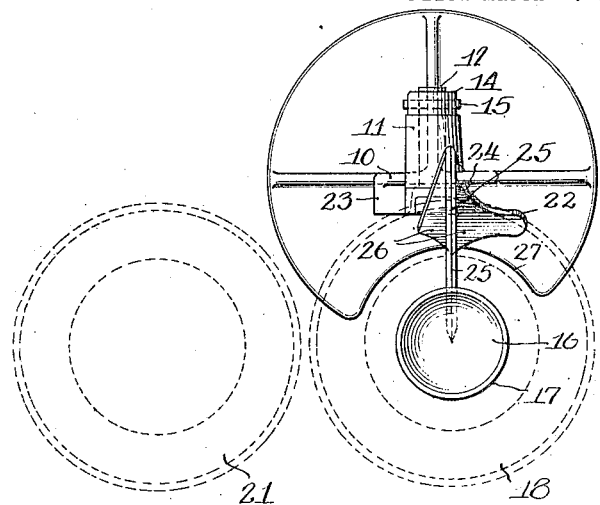
Figure 2:
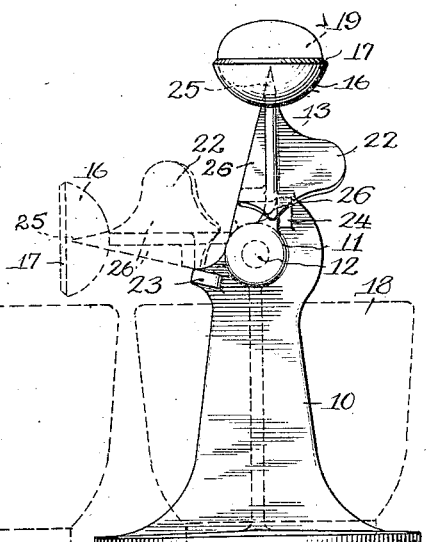
Figure 3:
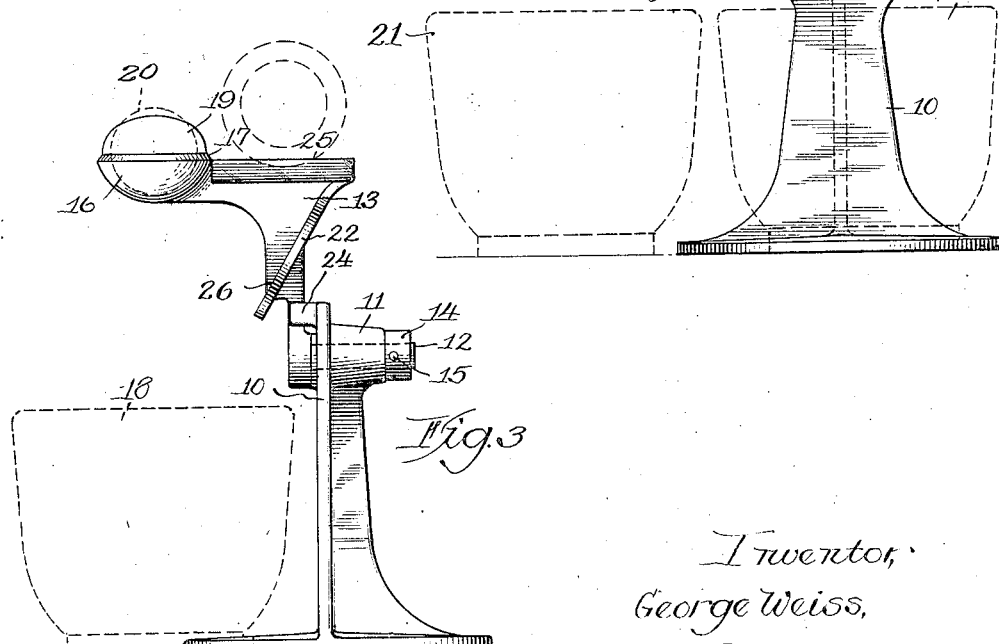

Figure 1 is a top plan view.
Figure 2 is an end elevation.
Figure 3 is a side elevation.

Referring more particularly to the drawing, the numeral 10 designates generally a supporting base or standard, which may be of any desired size and configuration and constructed of any suitable material. The base 10 is provided with a bearing 11, for receiving the pivot 12 of a member 13, which is adapted for free movement about the pivot for purposes to be hereinafter set forth.

The member 13 is preferably held connected with the base 10 by means of a collar 14 secured by means of a fastening device 15 upon the pivot 12.

The member 13 may be of any desired configuration and connected therewith is an open receptacle 16, the upper edge 17 of which receptacle is preferably formed in the shape of a knife edge.

The receptacle 16 is of such a size that when the contents of an egg are deposited therein the albumen of the egg will run or spill over the sides of the receptacle to be delivered into another receptacle 18, the knife edge 17 serves as a means for assisting in severing the albumen from the yolk of the egg.

The receptacle 16 is also preferably of a configuration that when the contents of the egg, designated generally by the reference numeral 19, in Figure 3, is deposited thereinto the egg contents will enter the receptacle in the shape shown by the dotted lines 20, thereby insuring that the egg contents will be delivered into the center of the receptacle, after which the contents will assume the shape indicated by the reference numeral 19.

The member 13 is adapted to be moved about its pivot 12, so that after the albumen has been separated from the yolk and deposited in the receptacle 18, the remaining contents of the receptacle 16, to-wit: the yolk, may be deposited into a receptacle 21, suitably positioned.

After the receptacle 16 has been dumped or emptied the member 13 may be moved about its pivot so that the receptacle will be in position to receive the contents of another egg.

Any suitable means may be provided, if desired, for moving the member 13 about its pivot such as a handle 22, and spaced stop devices 23—24 may be provided for limiting the extent of pivotal movement of the member 13. The stop 24 is so positioned that the center of the receptacle 16, with the parts in the position shown in Figure 2 in full lines, will pass over the center of the pivot 12, and thereby maintain the member 13 in an upright position. The stop 23 also serves as an abutment upon which the member 13 may fall and rest, the impact of the falling member 13 against the stop 23 serving to eject or throw the yolk of the egg out of the receptacle 16 and into the receptacle 21.

If desired, a knife edge 25 may be provided on the member 13 over which the shell of the egg may be broken and a flange 26 may also be provided beneath the knife edge 25 for deflecting into the receptacle 18 any of the albumen which may escape from the shell during the breaking operation and before the contents of the shell are placed in the receptacle 16.

The bottom of the standard or base 10 may be cut away or shaped as at 27, if desired, for the purpose of guiding and positioning the receptacle 18.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A device for separating the contents of an egg and embodying an upright, a support pivotally mounted upon the upright, an open receptacle carried by the support and spaced from the pivot of the support, and a stop for limiting the pivotal movement of the upright in one direction, said stop being disposed to one side of the said pivot whereby the center of the support will pass over the center of the pivot when the support engages the stop and thereby maintain the receptacle in a position to receive the egg contents.

2. A device for separating the contents of an egg and embodying an upright, a support pivotally mounted upon the upright, an open receptacle carried by the support and spaced from the pivot of the support, a stop for limiting the pivotal movement of the upright in one direction, said stop being disposed to one side of the said pivot whereby the center of the support will pass over the center of the pivot when the support engages the stop and thereby maintain the receptacle in a position to receive the egg contents, and a second stop for limiting the movement of the support in the opposite direction, the second recited stop being disposed in close proximity to the pivot of the support and against which second stop the support strikes to assist in ejecting the contents of the receptacle.

3. A device for separating the contents of an egg and embodying an upright, a support pivotally connected by one end with the upright, an open receptacle carried by the support and spaced from the pivot thereof, and stops for limiting the movement of the said support in both directions about its pivot.

4. A device for separating the contents of an egg and embodying an upright, a support pivotally connected by one end with the upright, an open receptacle carried by the support and spaced from the pivot thereof, a stop for limiting the movement of the said support in one direction about its pivot, and means co-operating with the support for discharging the contents of the receptacle by centrifugal force when the support is moved in one direction about its pivot, the said stop and the said means being disposed in close proximity to the pivot of the support.

5. A device for separating the contents of an egg and embodying an upright, a support pivotally connected by one end with the upright, an open receptacle carried by the support and spaced from the pivot thereof, stops for limiting the movement of the said support in both directions about its pivot, a shell breaking edge carried with the support, and a deflector also carried by the support and disposed beneath the said edge.

6. A device for separating the contents of an egg, embodying a supporting base, an open receptacle, means pivotally connecting the receptacle with the base, said receptacle being adapted to receive the contents from the shell and being of a size to cause the albumen to spill over the side thereof, said receptacle being spaced from the pivot and being movable about its pivot to dump the contents therefrom, and stops for limiting the extent of pivotal movements of the receptacle, one of the stops serving as an abutment for assisting in ejecting the contents of the receptacle.

7. A device for separating the contents of an egg, embodying a supporting base, an open receptacle, means pivotally connecting the receptacle with the base, said receptacle being spaced from the pivot, adapted to receive the contents from the shell and being of a size to cause the albumen to spill over the side thereof, said receptacle, having a knife edge operating to assist in severing the albumen from the yolk and being movable about its pivot to dump the contents therefrom, and stops for limiting the extent of pivotal movements of the receptacle, one of the stops being so disposed with respect to the pivot of the receptacle to form an abutment to assist in discharging the contents of the receptacle.

In testimony whereof I have signed my name to this specification, on this 25th day of February, A. D. 1922.

GEORGE WEISS.